United States Patent [19]
Geschwender

[11] 3,887,419
[45] June 3, 1975

[54] APPARATUS AND METHOD FOR CONTINUOUSLY FORMING HONEYCOMB MATERIAL

[75] Inventor: Robert C. Geschwender, Lincoln, Nebr.

[73] Assignee: Lancaster Research and Development Corporation, Lincoln, Nebr.

[22] Filed: July 16, 1973

[21] Appl. No.: 379,451

[52] U.S. Cl. ............... 156/197; 156/324; 156/361; 156/378; 156/495
[51] Int. Cl. ............................................. B31d 3/02
[58] Field of Search ................... 156/197, 494–496, 156/350–351, 360–361, 366–368, 378, 64, 301, 474, 324, 545; 226/4, 8, 24, 26, 33, 34, 38–39, 117, 134, 156

[56] References Cited
UNITED STATES PATENTS

| | | | |
|---|---|---|---|
| 2,115,737 | 5/1938 | Menschner | 226/4 X |
| 2,731,379 | 1/1956 | Wheeler | 156/197 |
| 2,995,181 | 8/1961 | Borys | 156/545 |
| 3,185,610 | 5/1965 | Lincoln et al. | 156/495 X |
| 3,684,618 | 5/1970 | Geschwender | 156/197 X |

Primary Examiner—Charles E. Van Horn
Assistant Examiner—David A. Simmons
Attorney, Agent, or Firm—Koenig, Senniger, Powers and Leavitt

[57] ABSTRACT

Apparatus for continuously forming honeycomb material of predetermined width dimensions. Feed rolls are provided for continuously feeding open cell honeycomb material with its cells expanded to a preselected degree so that the honeycomb material has a predetermined width. Intermittently operable drive rolls are responsive to the feeding of a preselected length of open cell honeycomb material by the feed rolls for supplying thereto from a honeycomb material source a length of less completely expanded honeycomb material which when expanded to the preselected degree will have a length equal to said preselected length thereby to insure that the feed rolls continuously form honeycomb material having the preselected degree of expansion and the predetermined width. A method of continuously forming honeycomb material of predetermined widths is also disclosed.

38 Claims, 5 Drawing Figures

APPARATUS AND METHOD FOR CONTINUOUSLY FORMING HONEYCOMB MATERIAL

BACKGROUND OF THE INVENTION

The present invention relates generally to apparatus and methods for forming honeycomb core material and in particular to such apparatus which will continuously form expanded honeycomb material of any of a wide variety of predetermined widths.

Honeycomb material made of kraft paper, foil, sheet plastic material, etc., is widely used as a core material for forming panels, doors, etc. Apparatus and methods for forming such honeycomb material are disclosed, for example, in U.S. Pat. Nos. 3,528,334 and 3,684,618, while U.S. Pat. Nos. 2,731,379 and 3,587,479 additionally describe utilizing the thus-formed honeycomb material as a core to which facing materials are bonded thereby to continuously form honeycomb panel. Supplying honeycomb material in a wide variety of lengths presents no serious problems inasmuch as this material may lengths made continuously and the desired lingths can be conveniently cut off repetitively. The need to supply a wide variety of widths, however, presents considerably more difficulty. While the width of expanded honeycomb material can be varied somewhat by either over- or under-expansion (which inherently varies the overall width of the expanded material) so that the cells are longer or shorter in the lengthwise direction than in width, this approach to varying the width of the expanded honeycomb material is limited because of loss of structural strength of the material if the configuration of the cells is too distorted in either direction. And making a continuous wide panel from honeycomb core and cutting it longitudinally to a desired width is uneconomical because of the high scrap loss. As a result the fabricator of honeycomb material must either make and stock a large number of widths of honeycomb, incur high scrap loss, or be sharply limited as to what width finished panels, etc., it can supply.

Another difficulty in fabricating honeycomb core materials and panels made by bonding facing materials, such as paper, metal foil and synthetic resin material, fiber glass, etc., to the opposite faces of the honeycomb core, is maintaining the width of the expanded core material constant within close tolerances as the material is continuously formed and facing material is applied. As the honeycomb material is typically formed of relatively thin and flexible material, such as kraft paper, it has a propensity for over- or under-expanding thereby to decrease and increase its width as it is being continuously processed. Thus the final faced core product such as panels may have the core narrower or wider than the facing material being applied, which results in a substantial amount of scrap that must be discarded. Various approaches have been made to continuously control the width of the expanded honeycomb material being processed, such as by continuously sensing the width of the expanded material and then controlling a braking mechanism to increase or decrease the retarding action as compacted honeycomb is stretched lengthwise to expand it. However, none of the previous approaches have been entirely satisfactory.

SUMMARY OF THE INVENTION

Among the several objects of this invention may be noted the provision of apparatus and methods for forming expanded honeycomb core material and panels in a wide variety of widths from a minimal number of widths of compacted honeycomb or the web material from which it is formed; and the provision of such apparatus and methods which continuously form expanded honeycomb core material and panels with a closely controlled width tolerance and of any of a wide range of different thicknesses. Other objects and features will be in part apparent and in part pointed out hereinafter.

Briefly, apparatus of this invention comprises means for continuously feeding open cell honeycomb material with its cells expanded to a preselected degree so that the honeycomb material has a predetermined width, and means intermittently operable in response to the feeding of a preselected length of open cell honeycomb material by the feeding means for supplying to the feeding means from a source of honeycomb material a length of less completely expanded honeycomb material which when expanded to the preselected degree will have a length equal to said preselected length thereby to insure that the feeding means continuously forms honeycomb having the preselected degree of expansion and the predetermined width. Also, in accordance with the method of this invention honeycomb material of a predetermined width dimension is formed by continuously feeding from feed rolls open cell honeycomb material having its cells expanded to a preselected degree so that the honeycomb material has a predetermined width dimension. The feeding of successive preselected lengths of honeycomb material from the feed rolls is sensed, and lengths of less completely expanded honeycomb material are fed intermittently to the feed rolls. Each of the lengths, when expanded to the preselected degree, has a length equal to said predetermined length of the expanded honeycomb.

BRIEF DESCRIPTION OF THE DRAWINGS

FIG. 2 is a diagrammatic view showing the expander and feeding sections for supplying expanded honeycomb core and facing material to the input portion of the panel forming section as shown on the right of FIG. 1;

FIG. 4 is a fragmentary sectional view of the delivery rolls for supplying an unexpanded honeycomb to the expander section shown on the right of FIG. 2; and FIG. 5 is a sectional view on line 5—5 of FIG. 4.

Corresponding reference characters indicate corresponding parts throughout the several views of the drawings.

DESCRIPTION OF THE PREFERRED EMBODIMENT

Figure 3:
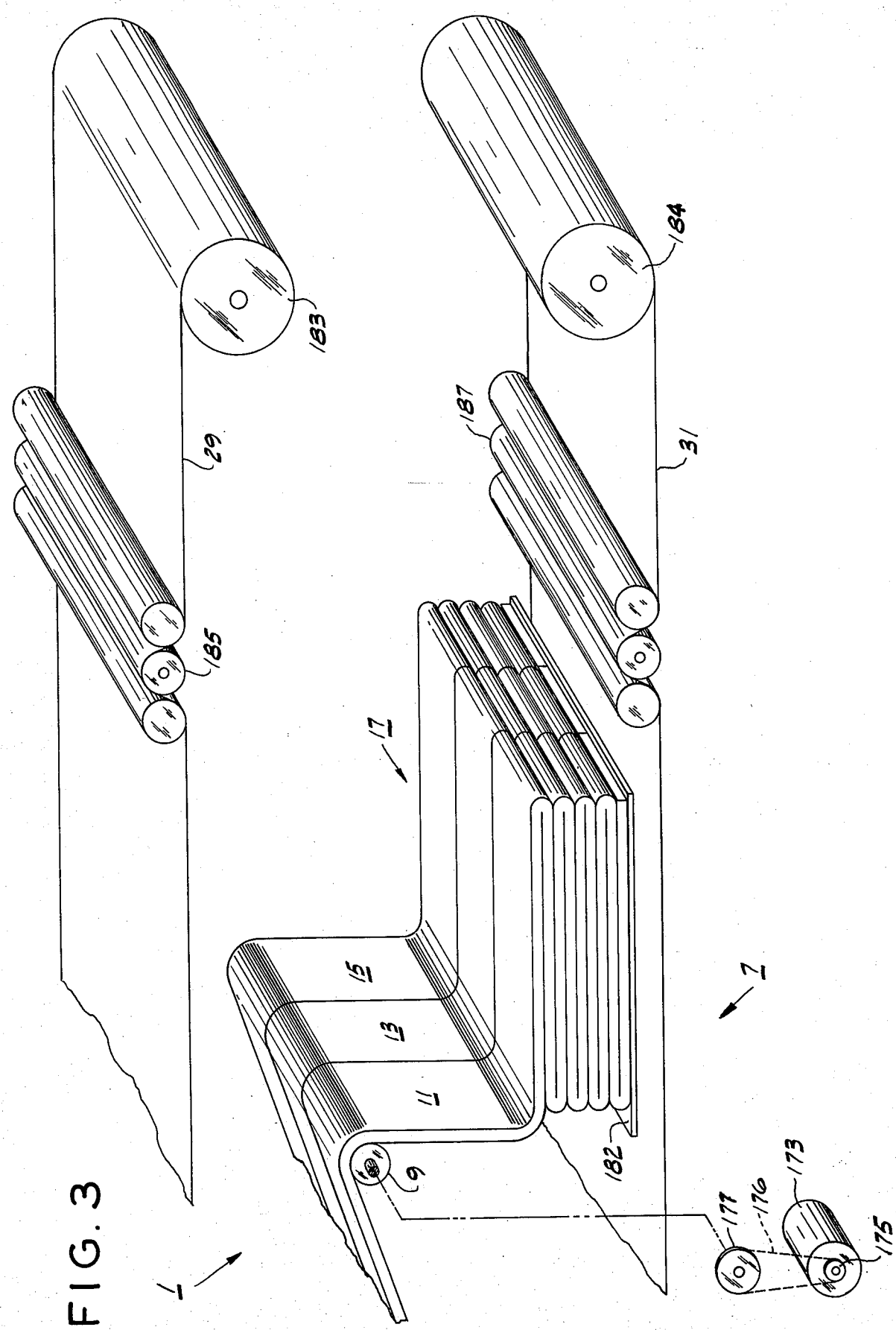
FIG. 3 is a diagrammatic view showing the supplies of facing materials and unexpanded honeycomb for delivery to the expander, feeder and panel forming sections of FIGS. 1 and 2.

Referring now to the drawings, there is shown at 1 apparatus (broken for clarity into FIGS. 1–3) for continuously forming paper honeycomb panel P of a predetermined width dimension W. Apparatus 1 is powered by a main or feed drive section 3 and a supply drive section 5 (which are interrelated, as discussed in detail hereinafter) and a honeycomb delivery drive section 7. A delivery roll 9 is continuously driven by delivery drive section 7 simultaneously to deliver or supply a plurality of strips of unexpanded honeycomb core material 11, 13, 15 stacked side-by-side from a source 17 of compacted honeycomb to drive rolls 19, 21, which are intermittently driven by supply drive section 5 of apparatus 1. Rolls 19, 21 draw and thus partially expand the unexpanded honeycomb strips controllably and concertedly to supply expanded honeycomb strips to a pair of feeder or glue rolls 23, 25. Feeder drive section 3 drives glue rolls 23, 25 which continuously feed side-by-side open cell honeycomb strips, expanded to a preselected degree so as to have an overall or cumulative predetermined width dimension equal to W, to a compression conveyor 27 of a type well known in the art. The side-by-side expanded honeycomb strips are fed to compression conveyor 27 together with two webs of paper facing material 29, 31 which are adhered to opposite faces 33, 35 of the expanded open cell honeycomb strips thereby to continuously form the honeycomb panel P which proceeds through the compression conveyor to a cutoff station or other assembly line stations (not shown) at which further manufacturing operations may be performed on honeycomb panel P.

Figure 1:
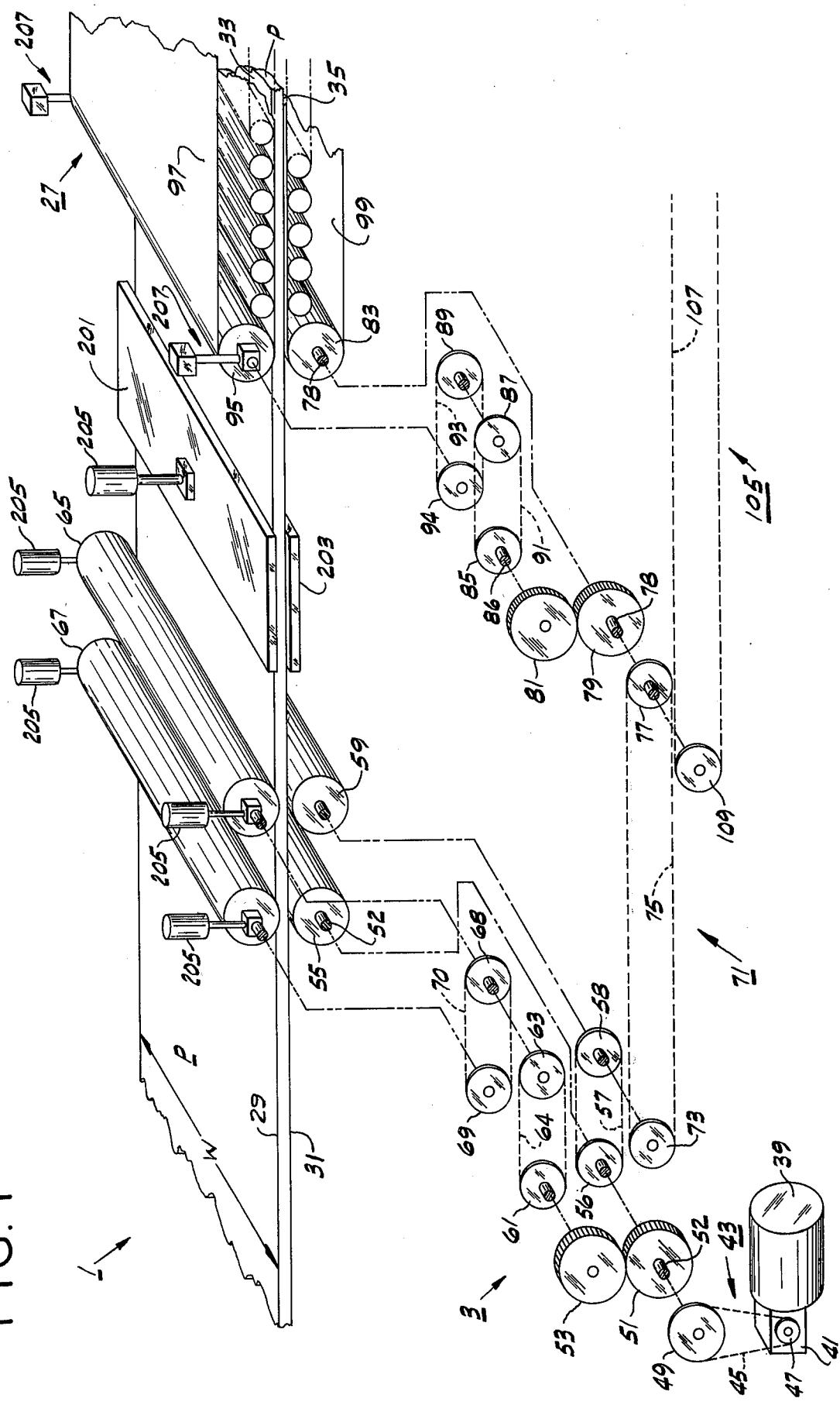
FIG. 1 is a diagrammatic view showing the main drive and panel output sections of apparatus of the present invention.

More particularly, as shown in FIG. 1, feed drive section 3 includes a motor 39 which drives a speed reducer 41, and a power take-off 43, such as a chain 45 and a pair of sprockets 47, 49. Sprocket 49 drives a gear 51 keyed to a shaft 52 of an output roll 55. Also keyed to shaft 52 is a sprocket 56, which through a chain 57, drives another sprocket 58 keyed to a lower pull-out roll 59. A reversing gear 53 driven by its mating gear 51 drives a sprocket 61 which in turn drives another sprocket 63 through a chain 64. Sprocket 63 directly drives an upper pull-out roll 65, and an output roll 67 through sprockets 68 and 69 and a chain 70. The sprockets 61, 63, 68, 69 and chain drives 64 and 70 permit raising and lowering of the upper output and pull-out rolls 65 and 67 to accommodate honeycomb panel P of various thicknesses. All four rolls 55, 59, 65, 67 operate at the same peripheral speed as the compression conveyor 27 and feed rolls 23, 25.

Another power take-off, indicated generally at 71 includes a sprocket 73 keyed to the shaft of lower pull-out roll 59, and a chain 75 driving another sprocket 77. Sprocket 77 and a gear 79 are fixed to a shaft 78 of a lower conveyor roll 83. Meshing with gear 79 is a reversing gear 81 which, through an idler sprocket-chain assembly 85, 87, 89, 91 and 94, drives an upper conveyor roll 95. A pair of endless conveyor belts 97, 99 are driven by conveyor rolls 83, 95, and in turn the belts drive a pair of forward conveyor rolls 101, 103. Sprockets 85, 87, 89, 94 and the chain drives 91, 93 therefor constitute means permitting the raising and lowering of upper conveyor roll 95 to accommodate various thicknesses of honeycomb panel P.

Figures 2, 4, 5:
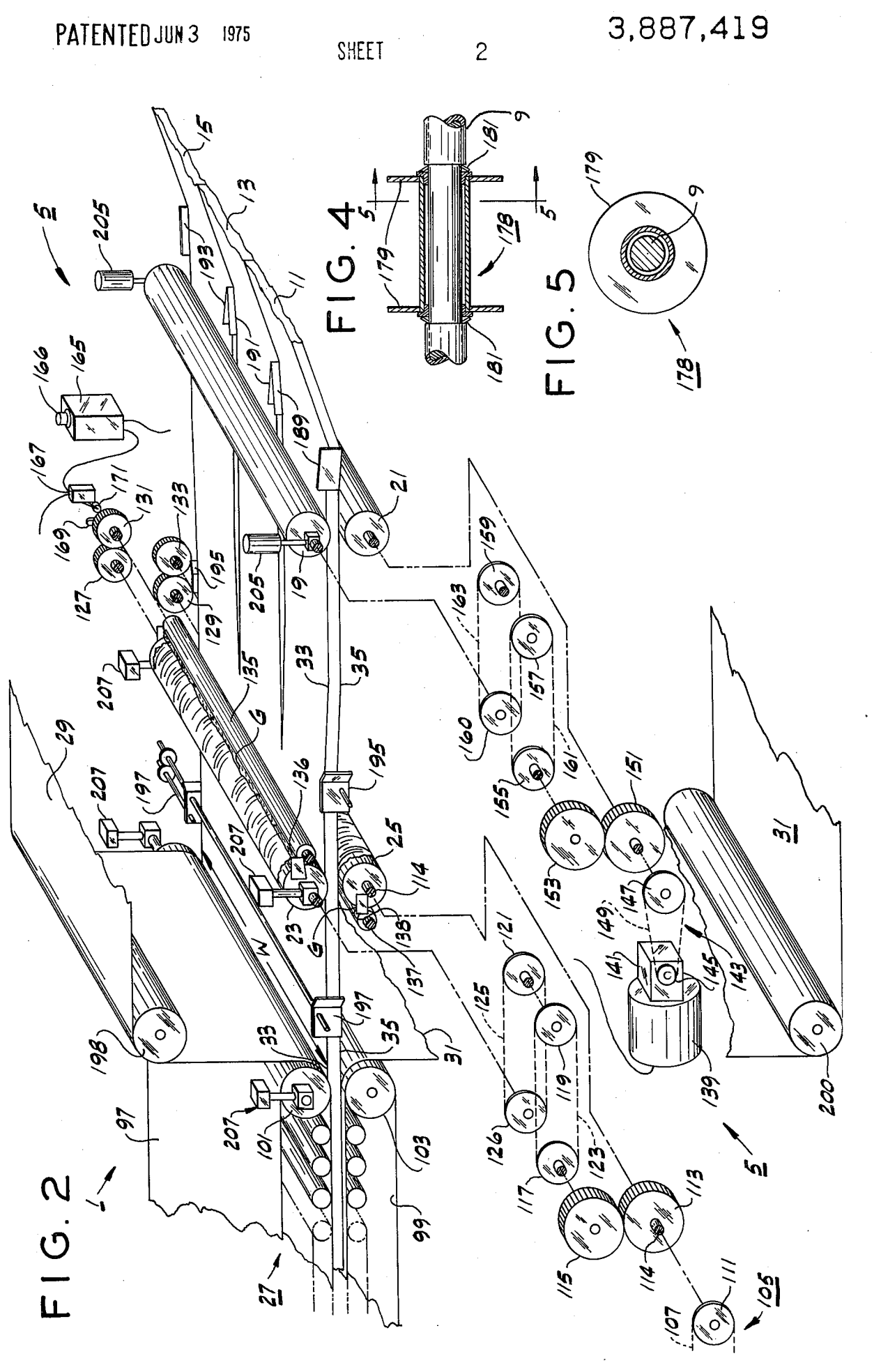

Referring now also to FIG. 2, a power take-off 105, comprising a chain 107 driven by a sprocket 109 and driving a sprocket 111, drives a gear 113 fixed to a shaft 114 of lower feed roll 25. A reversing gear 115 drives the upper feed roll 23 via an idler chain and sprocket assembly 117, 119, 121, 123, 125 and 126. Sprockets 117, 119, 121, 126 and chains 123, 125 permit raising and lowering upper feed rolls 23 to accommodate honeycomb panel P of various thicknesses.

Fixed to the far ends of the respective shafts of feed rolls 23, 25 are gears 127, 129 which drive a pair of reversing gears 131, 133 keyed to the shafts of a pair of doctor rolls 135, 137. Doctor rolls 135, 137 are disposed closely adjacent feed rolls 23, 25 to insure a substantially even supply of glue to the feed rolls from glue reservoirs 136 and 138.

In supply drive section 5, another electric motor 139 and speed reducer 141 drives, via a power take-off 143 (a pair of sprockets 145, 147 and a chain 149) a meshing pair of gears 151, 153. Gear 151 directly drives lower drive roll 21 while reversing gear 153 drives upper drive roll 19 by means of an idler sprocket chain assembly including sprockets 155, 157, 159, 160 and chain drives 161, 163, thus permitting raising and lowering of upper drive roll 19 to accommodate partially expanded honeycomb strips of varying thicknesses. As discussed in detail hereinafter, drive rolls 19, 21 control the proper expansion and merging of the partially expanded honeycomb strips which are supplied thereto. This is accomplished by an electronic timing device or timer 165 (such as that sold under the trade designation 7082 by Cutler-Hammer Co.) which actuates rolls 19, 21 for any desired preselected time period, adjustable by a control knob 166.

A switch 167, is positioned adjacent reversing gear 131 which is synchronously driven by upper feed roll 23. Gear 31 carries an arm 169 which serves as an actuator for a switch follower arm 171 so as to momentarily actuate switch 167 each time upper feed roll 23 rotates through one complete revolution. As each complete revolution of feed rolls 23, 25 feeds out a preselected linear of expanded honeycomb material, arm 169 actuates switch 167 which energizes timer 165. The time period during which timer 165 operated drive rolls 19, 21 is correlated with the peripheral speed thereof to predeterminately supply the feed rolls a length of less completely expanded honeycomb strips which when expanded in this feeder section to the preselected degree will have a length equal to the preselected length thereby to insure that the feeding means continuously forms honeycomb material having the preselected degree of expansion and the predetermined width W. Therefore, the duration of each of the time periods during which drive rolls 19, 21 operate is a function of the length of expanded honeycomb material fed from feed rolls during the preceding revolution thereof, but it is independent of the speed of the feed rolls 23, 25, and thus is unaffected by variations in the drive speed of the main drive powered by motor 39. The peripheral speed of drive rolls 19, 21 during their intermittent periods of actuation is greater than that of the feed rolls 23, 25. During each operating period, however, rolls 19, 21 have a constant speed. Preferably the peripheral speed of rolls 19, 21 does not greatly exceed that of feed rolls 23, 25. However, even at full production line speed there will still be dwell periods where rolls 19, 21 momentarily stop. Also it will be understood that the switching means exemplified by switch 167 may be actuated at any preselected degree of rotation of rolls 23, 25, either more or less than 360°.

Partially expanded honeycomb supplied to rolls 19, 21 is delivered to the expander section by delivery roll 9 (FIGS. 3–5) which is continuously driven by a motor 173 via a chain-sprocket assembly 175, 176, 177, the latter sprocket being keyed to the shaft of roll 9. In order to insure an adequate supply of honeycomb to the expander section, roll 9 is overdriven. That is, the rate of feeding honeycomb strips 11, 13, 15 by roll 9 exceeds that at which it is demanded by section 5. To accomplish this delivery roll 9 is equipped with a plurality of slip clutches 178 having a pair of toothed driving disks 179 which grip and feed honeycomb strips 11, 13, 15, and these disks are mounted between pairs of pressure wafer springs 181 which allow disks 179 to slip any time the supply of honeycomb strips exceeds that needed.

The degree of expansion of honeycomb material predetermines the width dimension thereof, and honeycomb material can be over- and under-expanded about 10 percent to 20 percent with respect to an optimum or symmetrical opencell state. For instance, honeycomb material, which has a width dimension of 10 inches when expanded to its optimum open-cell state, can be under-expanded to a width of about 8 inches or over-expanded to a width of about 11½ to 12 inches without significant loss of core strength. By using one or more strips of a single selected width of honeycomb material, or several such strips disposed side-by-side, a honeycomb core of almost any desired predetermined width dimension W from a few inches to several feet may be conveniently formed. This is accomplished by preselecting the degree of expansion of one or more of the honeycomb strips 11, 13, 15, to attain the predetermined cumulative width dimension W.

The supply or source 17 of compacted honeycomb is supported on a rack 182 disposed between roll stands supporting upper and lower sources or rolls 183, 184 of kraft paper facing material 29, 31. The continuous webs of facing material pass through tension sensing rolls 185, 187 which maintain these webs of facing material stretched under a preselected amount of tension controlled by braking of rolls 183, 184. Substantially unexpanded or compacted honeycomb strips 11, 13, 15 are concertedly drawn from the compaction source 17 and delivered into plurality of expanding chutes each including a separate converging channel 189, 191, 193 by roll 9. As noted above the chutes are maintained full of compacted honeycomb by the overdriving action of roll 9. Expander rolls 19, 21, which are preferably surfaced with textured rubber grip the upper and lower faces of the honeycomb strips and draw them from channels 189, 191, 193. Because of the side pressure on the compacted material, it is controllably expanded as it is drawn from each chute thereby to form three side-by-side strips or ribbons of partially expanded honeycomb. Typically the expansion is such that the strips have a width equal to about 110 percent to 120 percent of the final core and panel width W. Thus the intermittently operable expander rolls 19, 21 supply to the feeding means including feed rolls 23, 25 three side-by-side lengths of less completely expanded honeycomb material from the expander chutes during each period of operation thereof. The length of each of these strips supplied is made equal to the length of core of fully expanded honeycomb fed from rolls 23, 25 during the preceeding revolution thereof by proper adjustment of the duration of the time period established by timer 165.

As the three side-by-side strips of honeycomb advance toward the nip of feed rolls 23, 25 in this feeder section they are merged into a continuous width core with no gaps by a pair of adjustable side pressure plates 195 which establish core width W and center the merged core strips for passage through rolls 23, 25. These rolls drivingly engage the opposite faces of the merged strips of properly expanded honeycomb material and simultaneously apply glue G to the opposite faces thereof. In this manner, it is assured that feed rolls 23, 25 continuously feed out a core of honeycomb material expanded to its predetermined width dimension W. Adjustable opposite side pressure plates 197 are disposed downstream of feed rolls 23, 25 to maintain the width W and keep the core centered with respect to the webs of facing material. These are drawn from rolls 183, 184, brought into contact with the glue carrying upper and lower faces of the core material after they are drawn around rollers 198, 200 and then adhered to the opposite faces thereof as they are moved by the endless belts 97, 99 through compression conveyor 27 of the panel forming section. This conveyor 27 and pull-out rolls 55, 67 and 59, 65 respectively move the honeycomb panel P through two opposed optional heating plates 201, 203 and positively set the glue as the completed panel P exits from the panel forming section.

Apparatus 1 maintains tension on the facing material 29, 31 throughout the entire process by having the drive components slightly overdrive or overrun the preceeding ones. Thus pull-out rolls 55, 67 and 59, 65 have a slightly greater circumference than any other rolls thus providing them with a slightly greater peripheral speed than that of conveyor rolls 83, 95, 101 and 103 and maintaining the facings of panel P smooth and taut. Apparatus 1 will accommodate or handle honeycomb material of a wide variety of thicknesses as upper rolls 19, 23, 101, 95, 65 and 67 and heating plate 201 can all be easily adjusted up or down relative to their opposed respective rolls 21, 25, 103, 83, 59 and 55 and lower heater plate 203. Air cylinders 205 are provided for this purpose, for rolls 19, 65 and 67 and heating plate 201 also function to bias these rolls and heater plate toward their respective opposed lower rolls and heater plate to adjust the gripping force of the rolls and the sliding contact of the heater plate. Threaded block assemblies 207 are provided on conveyor upper rolls 95, 101 and upper glue and feed roll 23 to selectively raise and lower these rolls.

Typical apparatus built in accordance with this invention will produce honeycomb panels at a rate of about 30 feet per minute in preselected widths from about eight inches to about five feet from unexpanded or compacted honeycomb of ½ inch – 4 inches in thickness and with a typical standard width (when properly fully expanded or opened) of 10 inches. It will be understood that any other standardized width of honeycomb may be selected and more than three side-by-side strips and chutes may be utilized, one or more at a time, thus providing an extremely versatile and flexible method and apparatus for production of honeycomb panel. The selected or predetermined panel width is quite precisely maintained as is the desired degree of cell expansion by this apparatus and method and more particularly by the intermittently operable means constituted by rolls 19, 21, drive section 5 and timer 165.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Apparatus for continuously forming honeycomb material of a predetermined width dimension comprising:
   means for continuously feeding open cell honeycomb material with its cells expanded to a preselected degree so that the honeycomb material has said predetermined width;
   a source of less completely expanded honeycomb material; and
   means intermittently operable in response to the feeding of a preselected length of open cell honeycomb material by the feeding means for supplying to the feeding means from the source a length of less completely expanded honeycomb material which when expanded to the preselected degree will have a length equal to said preselected length thereby to insure that the feeding means continuously forms honeycomb material having the preselected degree of expansion and the predetermined width.

2. Apparatus according to claim 1, wherein the intermittently operable means includes a drive roll having a peripheral speed exceeding that of said feeding means.

3. Apparatus according to claim 2, wherein the drive roll supplies less completely expanded honeycomb material at a substantially constant rate upon the actuation thereof.

4. Apparatus according to claim 3, wherein the honeycomb material entering the intermittently operable means has been expanded to a width in the range of about 110 to 120 percent of the predetermined width dimension.

5. Apparatus according to claim 2, wherein the intermittently operable means includes a timer which actuates the intermittently operable means for a predetermined period of time.

6. Apparatus according to claim 5, wherein the intermittently operable means includes means for adjusting the timer to vary the predetermined time period.

7. Apparatus according to claim 6, wherein the feeding means includes a feed roll the degree of rotation of which is determinative of the preselected length.

8. Apparatus according to claim 7 which further includes switching means responsive to a selected degree of rotation of said feed roll to operate said switching means thereby to actuate the intermittently operable means.

9. Apparatus according to claim 7, wherein the intermittently operable means includes an electric motor with a gear reduction drive which is energized by the timer.

10. Apparatus according to claim 7, wherein the intermittently operable means includes a pair of rolls drivingly engaged with opposite faces of the honeycomb material to effect the supply thereof to the feeding means.

11. Apparatus according to claim 10, wherein the feeding means comprises a second pair of rolls drivingly engaged with the opposite faces of the honeycomb material to effect the feed thereof.

12. Apparatus according to claim 1, wherein the intermittently operable means supplies a plurality of strips of less completely expanded honeycomb material of preselected widths substantially in side-by-side relation.

13. Apparatus according to claim 12, further comprising means for predetermining the width dimension of each of the strips of side-by-side honeycomb material delivered from the source to the intermittently operable means.

14. Apparatus according to claim 12, further comprising means for merging the side-by-side honeycomb material supplied to the feeding means.

15. Apparatus according to claim 12, further comprising means for maintaining merged the side-by-side honeycomb material fed from the feeding means.

16. Apparatus according to claim 1, wherein the feeding means further includes means for applying an adhesive to at least one face of the expanded honeycomb material.

17. Apparatus according to claim 1, wherein the feeding means and intermittently operable means are respectively adjustable to accommodate honeycomb material of different thicknesses.

18. Apparatus according to claim 16, further comprising means for continuously adhering facing material to opposite faces of the expanded honeycomb material supplied thereto by said feeding means.

19. Apparatus according to claim 18, wherein the adhering means comprises opposed rolls and endless belts of a compression conveyor, the endless belts also maintaining the facing material engaged with the opposite faces while moving the expanded honeycomb material from the feeding means.

20. Apparatus according to claim 1, further comprising a converging channel through which honeycomb material is pulled by the intermittently operable means to effect an initial predetermined partial expansion of the honeycomb material.

21. Apparatus according to claim 20, further comprising means for continuously delivering unexpanded honeycomb material from a source thereof to the converging channel, and means including a slip clutch for driving the delivery means at a rate exceeding that at which it is utilized by the apparatus thereby to insure a continuous supply of unexpanded honeycomb at the entrance to said channel.

22. Apparatus according to claim 13, wherein the width predetermining means comprises a plurality of side-by-side converging channels through which the honeycomb strips are drawn toward the intermittently operable means, the honeycomb strips being pulled through the converging channels by the intermittently operable means to effect an initial predetermined partial expansion of each honeycomb strip.

23. Apparatus according to claim 22, further comprising means for continuously delivering the honeycomb strips from a source of unexpanded honeycomb strips to the converging channels, and means including a slip clutch for driving the delivery means at a rate exceeding that at which it is utilized by the apparatus thereby to insure a continuous supply of unexpanded honeycomb at the entrance to said channels.

24. A method of forming honeycomb material of a predetermined width dimension comprising the steps of:
   continuously feeding from feed rolls open cell honeycomb material having its cells expanded to a preselected degree so that the honeycomb material has said predetermined width dimension; and
   intermittently feeding to said feed rolls lengths of less completely expanded honeycomb material each of which when expanded to the preselected degree has a length equal to said preselected length.

25. A method according to claim 24 which further includes the step of sensing the feeding of successive preselected lengths of honeycomb material from said feed rolls and initiating successive intermittent feeding steps upon the sensing of the feeding of each successive preselected length of expanded honeycomb from said feed rolls.

26. A method according to claim 25, in which the velocity at which said less completely expanded honeycomb material is intermittently fed is substantially constant and exceeds that at which said expanded honeycomb is continuously fed from the feed rolls.

27. A method according to claim 26, in which said intermittent feeding step is carried out for a timed period the duration of which is a function of the preceding preselected length of the expanded honeycomb fed from said feed rolls.

28. A method according to claim 24, in which an adhesive is applied to the faces of the expanded honeycomb material by feed rolls.

29. A method according to claim 24, in which a plurality of strips of less completely expanded material are intermittently fed in side-by-side relation to said feed rolls.

30. A method according to claim 29, in which the side-by-side strips of less completely expanded honeycomb material are merged as they are fed to said feed rolls.

31. A method according to claim 30, in which the cumulative width dimension of the expanded honeycomb material fed from the feed rolls is predetermined by controlling the degree of cell expansion of the strips of less completely expanded honeycomb.

32. A method according to claim 31, comprising the further step of adhering facing material to the faces of honeycomb material fed from the feed rolls and maintaining the facing material engaged with the faces while conveying such faced honeycomb material away from the feed rolls.

33. A method according to claim 24, comprising the preliminary step of simultaneously supplying and initially partially expanding honeycomb material from a source of unexpanded honeycomb material for the subsequent intermittent feeding of the honeycomb material to the feeding means.

34. A method according to claim 33, wherein the preliminary step includes pulling the unexpanded honeycomb material through a converging channel to initially partially expand the cells of the honeycomb material before it is intermittently fed to the feed rolls.

35. A method according to claim 34, wherein the preliminary step also includes maintaining a supply of unexpanded honeycomb material at the entrance of the converging channel.

36. A method according to claim 29, comprising the preliminary step of simultaneously supplying and partially expanding the strips from sources of unexpanded honeycomb strips for the subsequent intermittent feeding of the honeycomb strips to the feed rolls.

37. A method according to claim 36, wherein the preliminary step includes pulling the honeycomb strips through separate converging channels therefor to initially partially expand the honeycomb strips before they are intermittently fed to the feed rolls.

38. A method according to claim 37, wherein the preliminary step also includes maintaining a supply of unexpanded honeycomb strips at the entrances of their converging channels.

* * * * *